US012786984B2

(12) United States Patent
Jia et al.

(10) Patent No.: US 12,786,984 B2
(45) Date of Patent: Nov. 3, 2026

(54) OPTIMIZATION OF RESOURCE UNIT ALLOCATION

(71) Applicant: HEWLETT PACKARD ENTERPRISE DEVELOPMENT LP, Spring, TX (US)

(72) Inventors: Xuguang Jia, Beijing (CN); Xiaoyang Fu, Beijing (CN); Qiang Zhou, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 290 days.

(21) Appl. No.: 18/650,358

(22) Filed: Apr. 30, 2024

(65) Prior Publication Data

US 2025/0338268 A1 Oct. 30, 2025

(51) Int. Cl.
*H04W 72/121* (2023.01)
*H04W 72/0457* (2023.01)
*H04W 74/0816* (2024.01)

(52) U.S. Cl.
CPC ..... *H04W 72/121* (2013.01); *H04W 72/0457* (2023.01); *H04W 74/0816* (2013.01)

(58) Field of Classification Search
CPC ........... H04W 72/121; H04W 72/0457; H04W 74/0816; H04W 74/06; H04W 84/12; H04L 5/0037
See application file for complete search history.

(56) References Cited

U.S. PATENT DOCUMENTS

2012/0020339 A1* 1/2012 Lai ........................ H04W 48/20 370/338
2012/0275410 A1* 11/2012 Takahashi ............... H04L 5/006 370/329

(Continued)

FOREIGN PATENT DOCUMENTS

CN 115460159 A * 12/2022

OTHER PUBLICATIONS

An Overview on Resource Allocation Techniques for Multi-User MIMO Systems (Year: 2016).*

(Continued)

*Primary Examiner* — Yemane Mesfin
*Assistant Examiner* — Guoxing Fan
(74) *Attorney, Agent, or Firm* — Hewlett Packard Enterprise Patent Department

(57) ABSTRACT

Implementations of the present disclosure relate to the optimization of RU allocation. The method comprises determining a number of a plurality of clients and respective RU requirements. The method further comprises determining an allocation strategy index based on the number of the plurality of clients and a number of available RUs. If the allocation strategy index is greater than an allocation strategy threshold, the method further comprises selecting a global allocation strategy as a target allocation strategy. Otherwise, the method further comprises selecting an individual allocation strategy as the target allocation strategy. The method further comprises determining RUs to be allocated to the plurality of clients by performing the target allocation strategy. In this way, by the dynamic selection of the allocation strategy, the resources can be allocated according to the actual communication status, thereby increasing the utility of the resources.

18 Claims, 11 Drawing Sheets

(56) References Cited

U.S. PATENT DOCUMENTS

| | | | | |
|---|---|---|---|---|
| 2016/0080043 | A1* | 3/2016 | Tian | H04L 5/0007 375/267 |
| 2017/0339673 | A1* | 11/2017 | Choi | H04W 84/12 |
| 2018/0255555 | A1* | 9/2018 | Rangaraj Manavalan | H04W 72/535 |
| 2019/0052353 | A1* | 2/2019 | Kim | H04B 7/0452 |
| 2021/0368506 | A1* | 11/2021 | Yoshikawa | H04L 5/0007 |
| 2021/0398013 | A1* | 12/2021 | Liu | G06F 9/50 |
| 2022/0132365 | A1* | 4/2022 | Barton | H04W 84/12 |
| 2022/0140868 | A1* | 5/2022 | Yu | H04L 1/0061 370/329 |
| 2022/0159713 | A1* | 5/2022 | Changlani | H04W 74/002 |
| 2022/0264579 | A1* | 8/2022 | Inohiza | H04L 27/2602 |
| 2023/0141738 | A1* | 5/2023 | Schelstraete | H04L 5/0035 370/330 |
| 2024/0292456 | A1* | 8/2024 | Ajami | H04W 74/0816 |
| 2024/0306174 | A1* | 9/2024 | Feraboli | H04W 72/0453 |
| 2024/0397371 | A1* | 11/2024 | Li | H04L 47/30 |
| 2025/0151041 | A1* | 5/2025 | Park | H04B 7/022 |

OTHER PUBLICATIONS

Resource Unit (RU) based OFDMA Scheduling in IEEE 802.11ax system (Year: 2018).*
Enabling Massive Real-Time Applications in IEEE 802.11be Networks (Year: 2019).*
MMRU-ALLOC: An Optimal Resource Allocation Framework for OFDMA in IEEE 802.11ax (Year: 2020).*
A Survey on Multi-AP Coordination Approaches over Emerging WLANs: Future Directions and Open Challenges (Year: 2023).*

* cited by examiner

OPTIMIZATION OF RESOURCE UNIT ALLOCATION

BACKGROUND

Orthogonal Frequency Division Multiple Access (OFDMA) is a significant feature of wireless communication technology. OFDMA allows multiple client devices to transmit or receive from an access point (AP) at the same time by sharing available bandwidth. OFDMA's spectral efficiency improves transmission latency or delay in a radio frequency (RF) environment, which has moderate to high congestion level.

Additionally, OFDMA also increases throughput in certain deployments due to a reduction in collisions and contention time. OFDMA allows sub-carriers in a channel bandwidth to be grouped into smaller portions called "Resource Units" (RU). These individual RUs are assigned to different stations, which allows APs to serve them simultaneously during uplink and downlink transmissions.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

As discussed above, OFDMA allows the access point (AP) to communicate with the associated client devices simultaneously. Before the simultaneous communication, the resources need to be allocated to the respective client devices to schedule the transmission. In the related resource unit (RU) allocation algorithm, the AP allocates the RUs to the clients based on the data buffer length for each client and available RUs.

In the related allocation algorithm, the AP may select a client from the scheduler candidate list and determine its RU requirement. Then, the AP may check the availability of multiple RU (MRU)/single RU (SRU) sources. If the AP determines that the available RU resources are greater than the RU requirement, the AP allocates the RUs corresponding to the RU requirement size from the RU resource pool. If the available RU resources are less than or equal to the RU requirement, the AP attempts to reduce the RU requirement.

However, the RU utility issues often arise after the RU allocation is performed according to the conventional algorithm, such as insufficient RU availability or excessive unused RU resources. That is, there is no optimization in the related allocation algorithm such that the RU allocation performance is compromised.

In view of the above, various example implementations of the present disclosure propose a RU allocation optimization mechanism. In the mechanism, the AP manages the allocation of the RUs when receives the RU requirements from the clients associated with the AP. The AP determines the number of clients and their RU requirements. Then, the AP calculates an allocation strategy index based on the number of clients and the RUs available at the AP. The optimization strategy indicates whether the optimization is performed for all the clients globally or for each client individually. The AP compares the optimization strategy index with a predefined threshold and determines an optimization strategy based on the result of the comparison.

In the implementations in accordance with the present disclosure, when the allocation strategy index is greater than the predetermined threshold, the extent of the potential resource conflicts between the plurality of clients may be viewed as small. Thus, it may be assumed that there are enough resources to be allocated to every client device to implement the desired strategy. In this way, optimal resource allocation for each client can be achieved with the individual optimization strategy.

Relatively, when the allocation strategy index is smaller than the predetermined threshold, the potential resource conflicts between the plurality of clients may likely occur. The bandwidth provided by the available RUs may not be enough to guarantee individual optimization for all the client devices. Thus, the RU allocation will be considered overall. In this way, efficient resource utilization for all clients can be achieved by the global optimization strategy.

Figure 1:
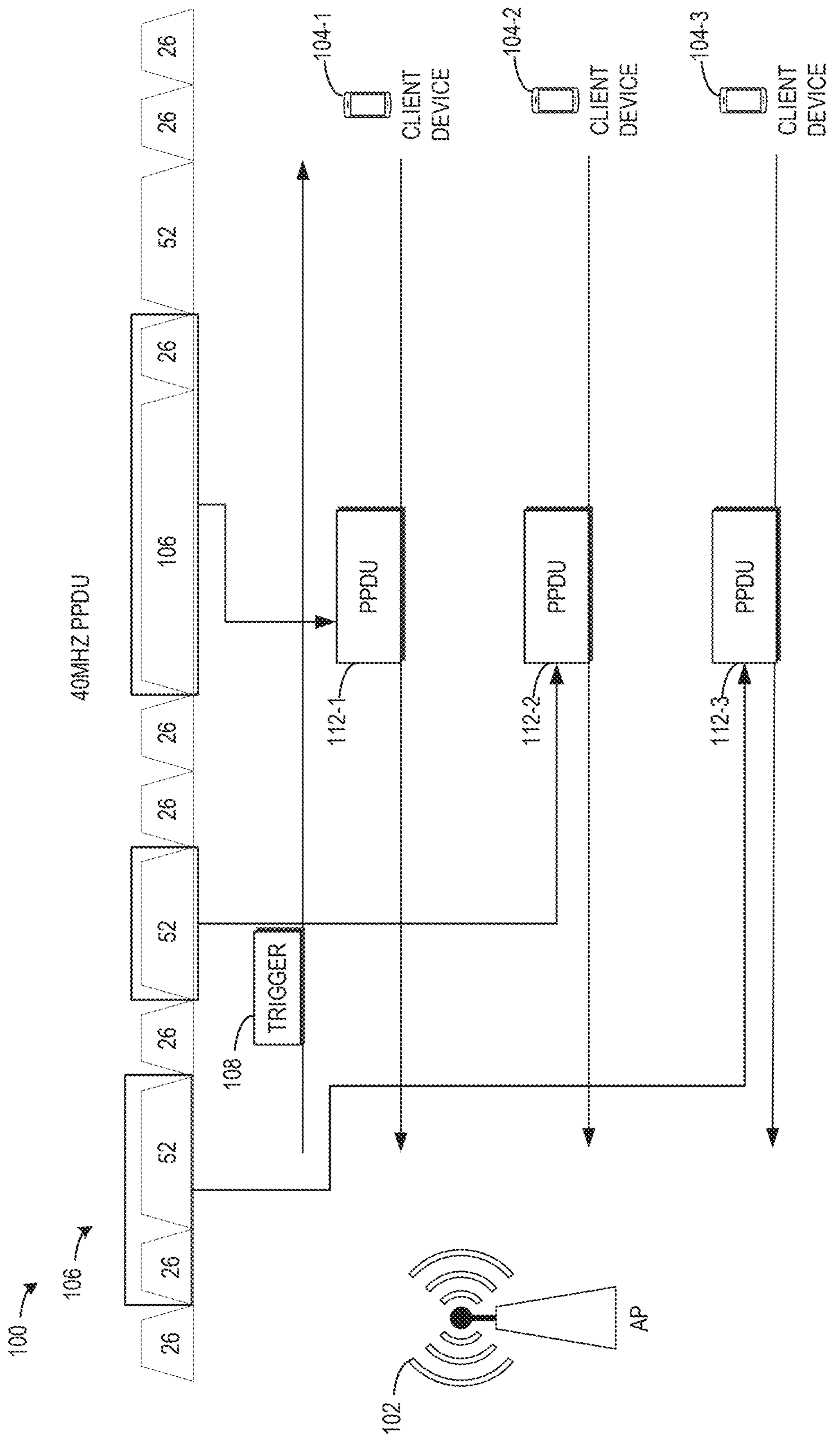
FIG. 1 illustrates an example network environment in which example implementations of the present disclosure may be implemented.

FIG. 1 illustrates an example network environment 100 in which example implementations of the present disclosure may be implemented. As illustrated in FIG. 1. The network environment 100 comprises an AP 102 and client devices 104-1. 104-2 and 104-3 (may also referred to as client device 104 individually or client devices 104 collectively) associated with the AP 102. The AP 102 transmits or controls the associated client devices 104 to send Presentation Protocol Data Units (PPDUs) of 40 MHz in one transmit opportunity (TXOP). The resource of a bandwidth of 40 MHz may include a plurality of RUs with different sizes. In the illustrated implementation, the resource 106 includes eight 26-tone RUs, three 52-tone RUs, and one 106-tone RU.

Before the transmission, the AP 102 needs to transmit the RU allocation information to the client devices 104 to schedule the uplink transmissions. As illustrated in FIG. 1, the AP 102 broadcasts a trigger frame 108 such that the associated client devices 104 may be able to receive the trigger frame 108. A trigger frame may be used to solicit uplink transmissions for one or more client devices. The trigger frame 108 may include an RU Allocation field to deliver the RU allocation information which indicates the size and location of the RUs allocated for the addressed client devices. Each specific RU is defined by a unique combination of 7 bits within the user information field of the trigger frame, known as the RU allocation bits.

In the illustrated implementation, the RU requirement of the client device 104-1 may be 132 tones, the RU requirement of the client device 104-2 may be 52 tones and the RU requirement of the client device 104-3 may be 78 tones. Compared with the 40 MHz bandwidth, the AP 102 determines that the likelihood of the potential conflicts among the client device 104-1, the client device 104-2, and the client device 104-3 are very low. The AP selects the individual allocation strategy. In this strategy, the RU allocations for the client device 104-1, the client device 104-2, and the client device 104-3 are determined individually and the number of RUs allocated to the client devices is considered. The allocation for one client device will not affect the others. By performing the strategy, the AP 102 allocates an MRU of 132 tones to the client device 104-1, allocates an RU of 52 tones to the client device 104-2, and allocates an MRU of 78 tones to the client device 104-3. Then, during one TXOP, a PPDU 112-1 occupying a 132-tone RU is transmitted from the client device 104-1 to the AP 102, a PPDU 112-2 occupying a 52-tone RU is transmitted from the client device 104-2 to the AP 102 and a PPDU 112-3 occupying a 78-tone RU is transmitted from the client device 104-3 to the AP 102. In this way, the number of RUs allocated to each client is limited thereby achieving better performance.

Figure 2:
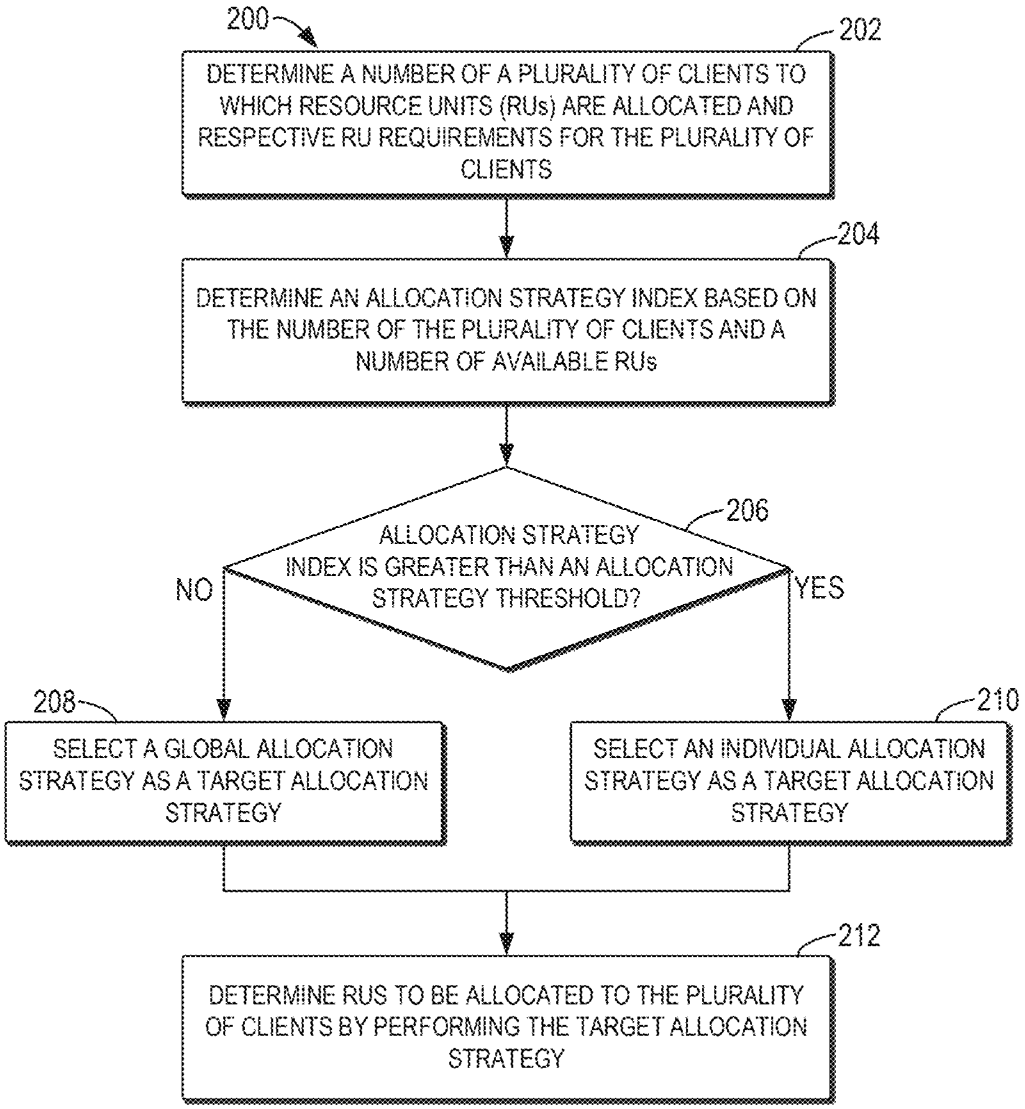
FIG. 2 illustrates a flowchart of an example method for allocating RUs in accordance with some example implementations of the present disclosure.

FIG. 2 illustrates a flowchart of an example method 200 for allocating RUs in accordance with some example implementations of the present disclosure. For the purpose of illustration, the method 200 will be described in association with the implementation as illustrated in FIG. 1. For example, the method 200 may be performed by the AP 102 in FIG. 1.

As illustrated in FIG. 2, at 202, the method 200 comprises determining a number of a plurality of clients to which RUs are allocated and respective RU requirements for the plurality of clients. For example, in the implementation as illustrated in FIG. 1, the AP 102 may determine that the 132 tone of RUs, 52 tone of RUs, and 78 tone of RU need to be allocated to three clients, including the client device 104-1, the client device 104-2, and the client device 104-3, respectively.

At 204, the method 200 comprises determining an allocation strategy index based on the number of the plurality of clients and a number of available RUs. In this case, the allocation strategy index indicates an extent of potential resource conflicts between the plurality of clients. For example, in the implementation, as illustrated in FIG. 1, the AP 102 may calculate the allocation strategy index based on the three client devices 104 and the available RUs in the resource 106.

In some example implementations, the allocation strategy index may be related to the performance history of single or multiple clients. For, example, if the historical performance where a single client is served is better than the historical performance where multiple clients are served, the resource conflicts are more likely to happen. Thus, the extent of potential resource conflicts between the plurality of clients is big. The allocation strategy index may be related to the availability of the resource and the number of clients. For example, if the demand for the resources of all the clients can be satisfied, the resource conflicts are not likely to happen. The allocation strategy index may also be related to other factors which indicates a likelihood of resource conflicts to happen, for example channel utilization.

At 206, the method 200 comprises determining whether the allocation strategy index is greater than an allocation strategy threshold. For example, in the implementation as illustrated in FIG. 1, the AP 102 may whether the calculated allocation strategy index is greater than the allocation strategy threshold. The allocation strategy threshold may be determined analogously to the allocation strategy index. For example, the allocation strategy index may be determined based on the number of the plurality of clients and a number of available RUs in the current situation which the allocation strategy threshold may be determined based parameters in a general or average situation.

For simplicity and without loss of generality, the allocation strategy threshold and the allocation strategy index may be determined by the following formula:

$$I = \frac{BW_C}{Num_C} \tag{1}$$

$$T = \frac{BW_A}{Num_A} \tag{2}$$

where I denotes the allocation strategy index, $BW_C$ denotes the total bandwidth provided by the available RUs in the current situation, $Num_C$ denotes the number of the clients in the current situation. Further, T denotes the allocation strategy threshold, $BW_A$ denotes the total bandwidth provided by the available RUs in the average situation, $Num_A$ denotes the number of the clients in the average situation For example, in an average situation, the resource of 80 MHz bandwidth may be allocated to 8 clients. Thus, the allocation strategy threshold T may be determined to be 10. In the situation as illustrated in FIG. 1, the allocation strategy index I may be determined to be 13.3.

If it is determined that the allocation strategy index is not greater than the allocation strategy threshold, the method 200 proceeds to 208. At 208, the method 200 comprises selecting a global allocation strategy as a target allocation strategy. In this case, the global allocation strategy is determined based on a total number of RUs to be allocated to the plurality of clients and RU requirements of the plurality of clients. For example, in the implementation as illustrated in FIG. 1, the AP 102 may select a global allocation strategy as a target allocation strategy.

Under the above-discussed framework, if the allocation strategy index is greater than the allocation strategy threshold, that is:

$$I \geq T \tag{3}$$

where $\text{Threshold}_{DRAOS}$ denotes the allocation strategy threshold. This indicates that network resources are relatively abundant, the likelihood of the resource conflicts is low, and local optimization is sufficient to meet demands of the clients.

If it is determined that the allocation strategy index is greater than the allocation strategy threshold, the method 200 proceeds to 210. At 210, the method comprises selecting an individual allocation strategy as the target allocation strategy. In this case, the individual allocation strategy is determined based on a number of RUs to be allocated to each of the plurality of clients and RU requirement of each client. For example, in the implementation as illustrated in FIG. 1, the AP 102 may select an individual allocation strategy as the target allocation strategy. The individual allocation strategy may include criteria related to the number of RUs to be allocated to each client. In some example implementations, one criterion may be maintaining the number of RUs allocated to each client under a threshold. The threshold may be determined based on the RU requirement of the client and a predetermined ration. In some further example implementations, one criterion may be minimizing the number of RUs allocated to each client.

Comparatively, if the allocation strategy index is smaller than the allocation strategy threshold, that is:

$$I < T \tag{4}$$

which indicates that the resources are sufficient but limited. Thus, the total resource unit usage needs to be coordinated to ensure the satisfaction of more clients' demands.

At 212, the method 200 comprises determining RUs to be allocated to the plurality of clients by performing the target allocation strategy. For example, in the implementation as illustrated in FIG. 1, the AP 102 may determine RUs to be allocated to the plurality of clients by performing the individual allocation strategy. The global allocation strategy may include criteria related to the number of RUs to be allocated to all the clients. In some example implementations, one criterion may be maintaining a sum of the numbers of RUs allocated to all the client under a threshold. The threshold may be determined based on the RU requirements of all the client and a predetermined ration. In some further example implementations, one criterion may be minimizing the sum of the numbers of RUs allocated to all the clients.

In this implementation, the allocation strategy is dynamically selected according to the comparison between the current situation and the average situation. In this way, an allocation strategy suitable for the current situation can be determined.

Figure 3:
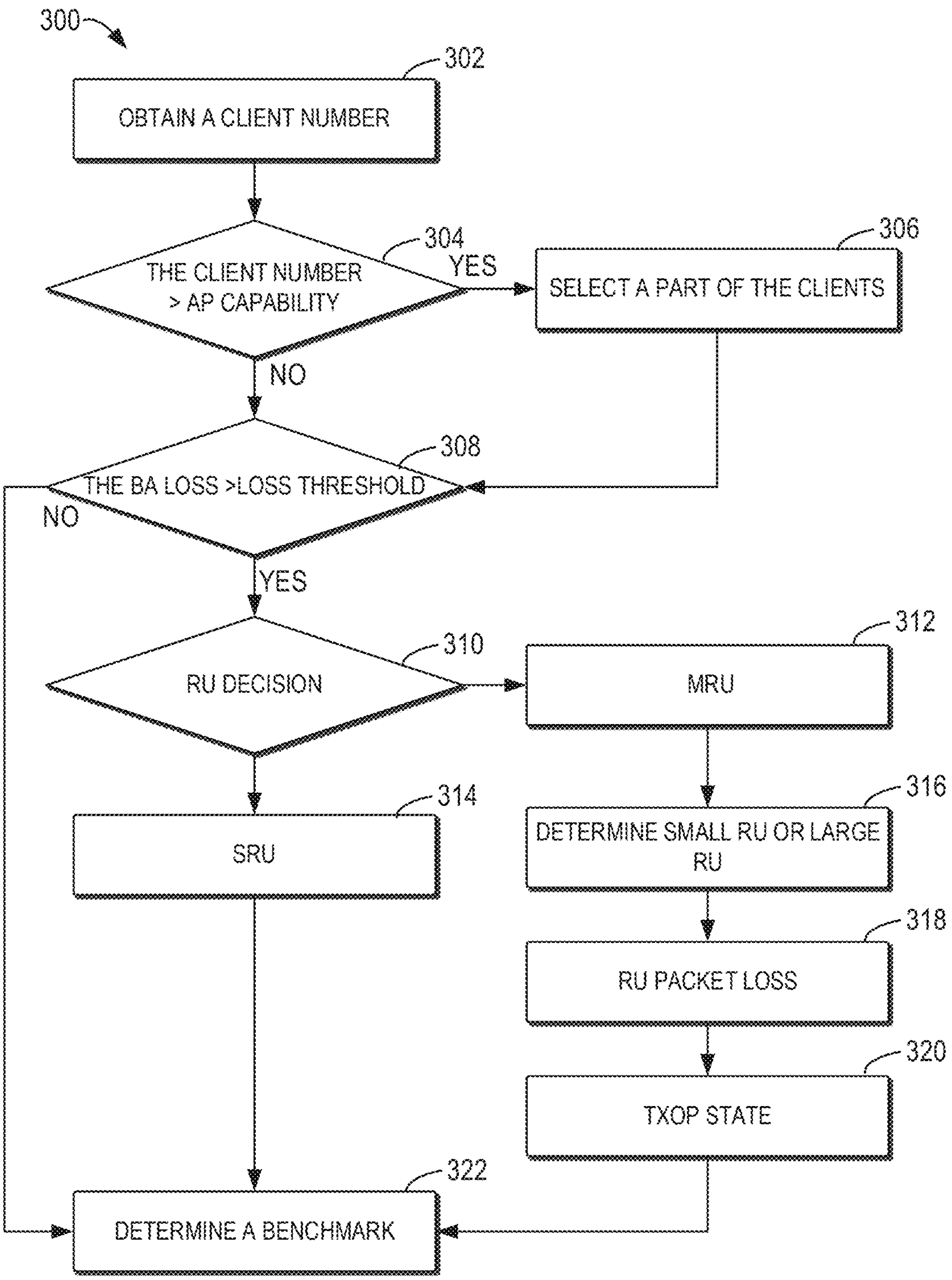
FIG. 3 illustrates a flowchart of an example method for determining a benchmark for allocating RUs in accordance with some example implementations of the present disclosure.

Before implementing the dynamic allocation strategy, the clients and the available RUs need to be determined. FIG. 3 illustrates a flowchart of an example method 300 for determining a benchmark for allocating RUs in accordance with some example implementations of the present disclosure. For the purpose of illustration, the method 300 will be described in association with the implementation as illustrated in FIG. 1. For example, the method 300 may be performed by the AP 102 in FIG. 1.

The determination of the clients and resources may be based on every time feedback parameter from each client, such as client's number, each client data length, and RU utility, then to predict the best output combinations between the client number and each client RU size to achieve best reasonable performance. The related parameter may include the number of the client.

The related parameter may also include the size of the required resource. When a TXOP is scheduled, the AP would know the time period when the air interface is occupied by the AP. Thus, the transmission time for a client is limited and the data size may be determined accordingly. For example, it is assumed that a data of size 1500 bytes and the RU is 242 tones, the time period can be calculated to be approximately 36 us.

The related parameter may also include packet loss/flapping rate. The packet loss/flapping rate can be measured by multiple station block acknowledgment bitmap received from the clients. For example, when the packet loss of one RU is greater than a threshold, this RU together with its related MRU may be not used in the RU allocation.

The related parameter may also include the utility of RU and the AP RU capability. The utility of RU may be the ratio of used RUs to the maximum supported RUs. In order to avoid interference between the adjacent basic service sets, some of the supported RUs will not be used. The utility of RU may be also associated with the packet loss. The AP RU capability indicates the maximum supported bandwidth and RU number. For example, in the implementation as illustrated in FIG. 1, the maximum supported bandwidth may be 40 MHz, and the maximum number of clients equal to the maximum number of the 26-tone RUs which may be 18 for 40 MHz.

The related parameter may also include the reserved RU. The reserved RU is only used for some critical cases, such as sudden traffic increase, interference cases, or emergency/low-latency traffic arrival. The related parameter may also include RU size selection. The RU with a size smaller than 242 tones is referred to small RU while the RU with a size not smaller than 242 tones is referred to large RU.

The parameters discussed above may be input into the decision procedure as illustrated in FIG. 3 to obtain respective benchmarks. As illustrated in FIG. 3, at 302, the AP 102 obtains a client number. At 304, the AP 102 determines whether the client number is greater than the maximum supported number of clients indicated by the AP capability. If the AP 102 determines that the client number is greater than the AP capability, the method 300 proceeds to 306. At 306, the AP 102 selects a part of the clients such that the number of the selected clients is not greater than the AP capability. Then, the method 300 proceeds to 308.

If the AP 102 determines that the client number is not greater than the AP capability, the method 300 proceeds to 308. At 308, the AP 102 determines whether the BA loss is greater than the loss threshold. If he AP 102 determines that the BA loss is not greater than the loss threshold, the method 300 proceeds to 322. At 322, the AP 102 determines a benchmark to allocate the available RUs to all the clients based on the low loss rate.

If he AP 102 determines that the BA loss is greater than the loss threshold, the method 300 proceeds to 310. At 310, the AP 102 determines which type of RUs are to be allocated. In one branch, the method 300 proceeds to 314. At 314, the AP 102 determines to use a single RU. Then, at 322, the AP 102 determines a benchmark to allocate the single RU.

On the other branch, the method 300 proceeds to 312. At 312, the AP 102 determines to use MRUs. At 316, the AP 102 determines to use small RUs or Large RUs, for example according to the size of the RU requirement of the clients. At 318, the AP 102 obtains the RU packet loss and at 320, the AP 102 obtains the TXOP state. At 322, the AP 102 determines a benchmark based on all the parameters obtained along this branch. In this way, by using the variety of input parameters in association with the decision procedure as illustrated in FIG. 3, suitable benchmarks for allocating the RUs can be determined thereby achieving transmissions with less TXOP and less packet loss based on the current environment.

Figure 4:
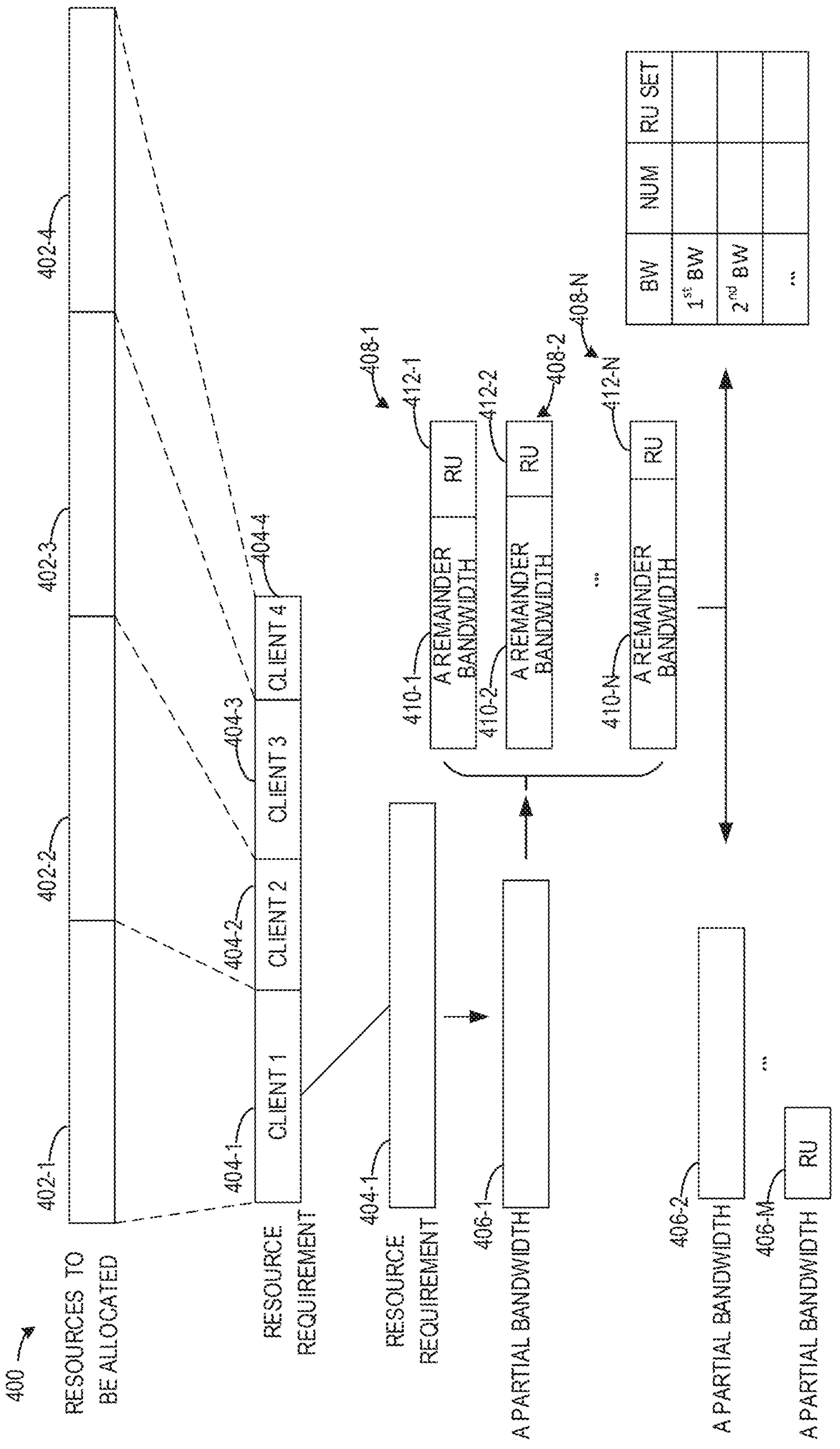
FIG. 4 illustrates a schematic diagram of an example procedure for performing an individual RU allocation strategy in accordance with some example implementations of the present disclosure.

To this end, the determination of the clients to which the RUs are to be allocated and the available RUs are described. Hereinafter, the individual allocation strategy will be described with reference to FIGS. 4-6. FIG. 4 illustrates a schematic diagram of an example procedure 400 for performing an individual RU allocation strategy in accordance with some example implementations of the present disclosure. As illustrated in FIG. 4, the AP determines that the resource 402-1 will be allocated to client 1 with an RU requirement 404-1, the resource 402-2 will be allocated to client 2 with an RU requirement 404-2, the resource 402-3 will be allocated to client 3 with an RU requirement 404-3 and the resource 402-4 will be allocated to client 4 with an RU requirement 404-4. Since the resources to be allocated are sufficient and may be redundant, the individual allocation strategy is selected.

As illustrated in FIG. 4, the RU allocation procedure for client 1 is described as an example. The allocation procedure may be viewed as a dynamic programming problem. In order to solve such problems, the common function is established as follows:

$$\mathrm{MIN\_RU}_{num}(RU_{\mathrm{req\_i}}) = \min_{0 \le j \le n-1} \mathrm{MIN\_RU}_{num}\left(RU_{req\_(i-RU_{unit\_j})}\right) + 1 \tag{5}$$

where $\mathrm{MIN\_RU}_{num}(\mathrm{RU}_{reg\_i})$ denotes the minimum RU number of RUs in a set of RUs allocated to the client, $\mathrm{RU}_{reg\_i}$ denotes the RU requirement bandwidth of the client i, and $\mathrm{RU}_{unit}$ denotes the bandwidth of a RU j. The result can be saved as dp[i] in the form of a one-dimensional array.

As illustrated in FIG. 4, a part of the RU requirement 401-1 is selected as a partial bandwidth 406-1. The goal is to determine a target set of RU to be allocated for providing the partial bandwidth 406-1 such that the number of RUs is minimized. The partial bandwidth 4061 is divided into a plurality of combinations of one RU and the remainder bandwidth, including a combination 408-1, a combination 408-2, and a combination 408-N. The combination 408-1 consists of a RU 412-1 and a corresponding remainder bandwidth 410-1. The combination 408-2 consists of a RU 412-2 and a corresponding remainder bandwidth 410-2. The combination 408-N consists of a RU 412-N and a corresponding remainder bandwidth 410-N.

The one RU in the combination has a respective RU size of the available RUs. For example, the available RUs may include a 26-tone RU, a 52-tone RU, a 78-tone RU, a 106-tone RU, and a 132-tone RU. In this case, the number of the combination would be 5. One of the plurality of combinations is different than the other combinations. The minimum number of RUs allocated for the remainder bandwidth is compared. The remainder bandwidth with the smallest RU number is selected as a new partial bandwidth 406-2 and the corresponding RU will be determined as a target RU. The same procedure will be performed on the partial bandwidth 406-2 and the subsequent partial bandwidth until the new partial bandwidth 406-M only includes one RU. A plurality of target RUs are obtained during the procedure and form a target set for partial bandwidth 406-1.

Figure 5:
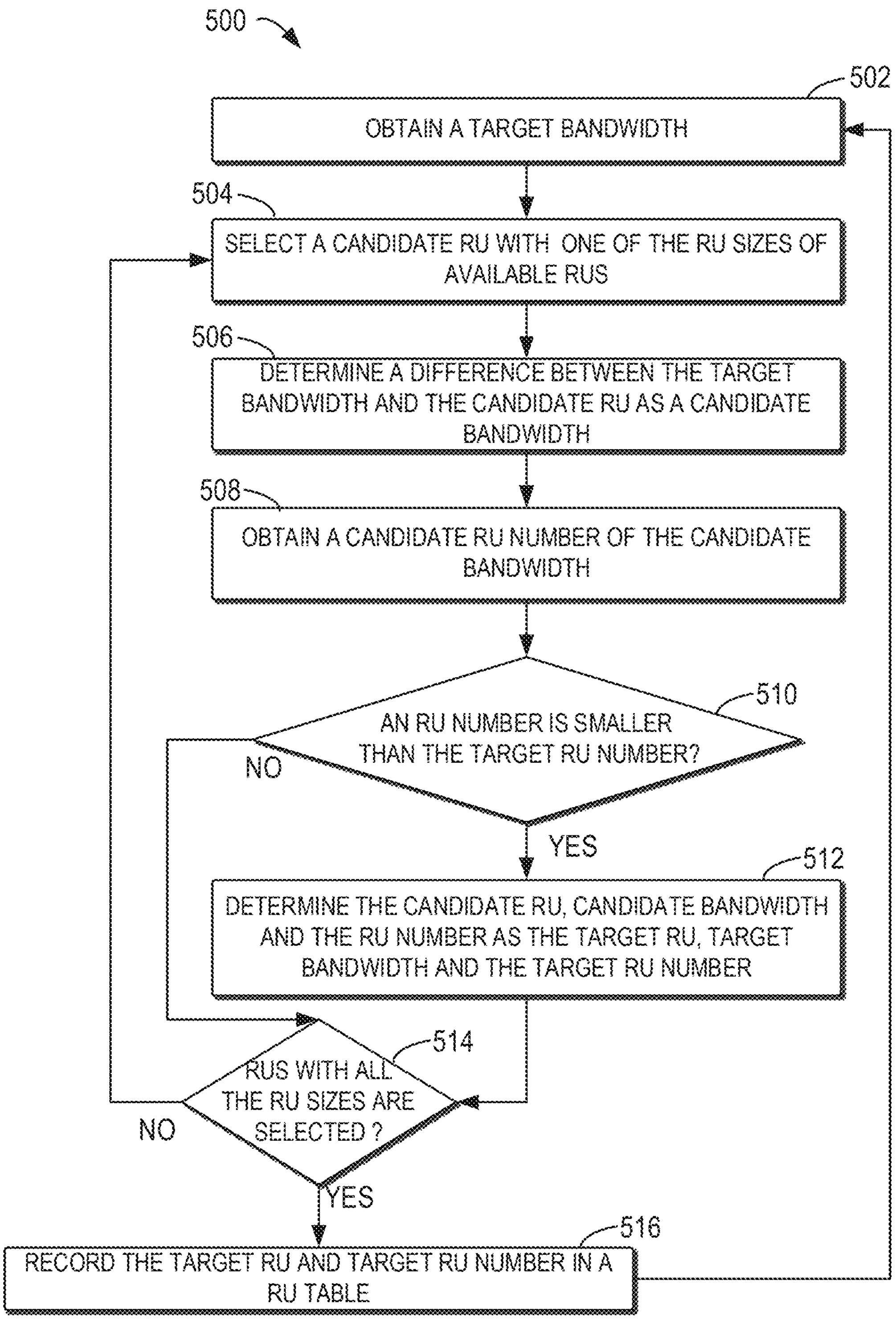
FIG. 5 illustrates a flowchart of an example method for performing an individual RU allocation strategy in accordance with some example implementations of the present disclosure.

FIG. 5 illustrates a flowchart of an example method for performing an individual RU allocation strategy in accordance with some example implementations of the present disclosure. For the purpose of illustration, the method 500 will be described in association with the implementation as illustrated in FIG. 1. For example, the method 500 may be performed by the AP 102 in FIG. 1.

As illustrated in FIG. 5, at 502, the AP 102 obtains a target bandwidth. At 504, the AP 102 selects a candidate RU with one of the RU sizes of the available RUs to start the procedure with regard to one combination. For example, the available RUs include the a 26-tone RU, a 52-tone RU, a 78-tone RU, a 106-tone RU and a 132-tone RU. At 506, the AP 102 determines a difference between the target bandwidth and the candidate RU as a candidate bandwidth. The candidate bandwidth may be corresponding to the remainder bandwidth as illustrated in FIG. 4.

At 508, the AP 102 obtains a candidate RU number of the candidate bandwidth. At 510, the AP 102 determines whether the candidate RU number is smaller than the target RU number. In this case, the initial value of the target RU number is null. If the AP 102 determines that the candidate RU number is smaller than the target RU number, the method 500 proceeds to 512. At 512, the AP 102 determines the candidate RU as the target RU, determines the candidate bandwidth as the target bandwidth, and determines the candidate RU number as the target RU number.

If the AP 102 determines that the candidate RU number is not smaller than the target RU number, the method 500 proceeds to 514. At 514, the AP 102 determines whether the RUs with all the RU sizes are selected. If the AP 102 determines that the RU with one of the RU sizes is not selected, the method 500 proceeds to 504 to analyze one other combination.

If the AP 102 determines that the RUs with all the RU sizes are selected, the method 500 proceeds to 516. At 516, the AP 202 records the target RU and the target RU number in a RU number table. Then, the method 500 proceeds to 502 to start a new iteration.

In the implementation, as illustrated in FIG. 5, an entire procedure for performing the individual allocation strategy is described. As a result, the target RUs are recorded in the RU table such that a target set of RUs with a minimum RU number can be obtained. Further, the minimum RU numbers for a plurality of bandwidths are also recorded thereby facilitating the subsequent allocation procedures.

Figure 6:
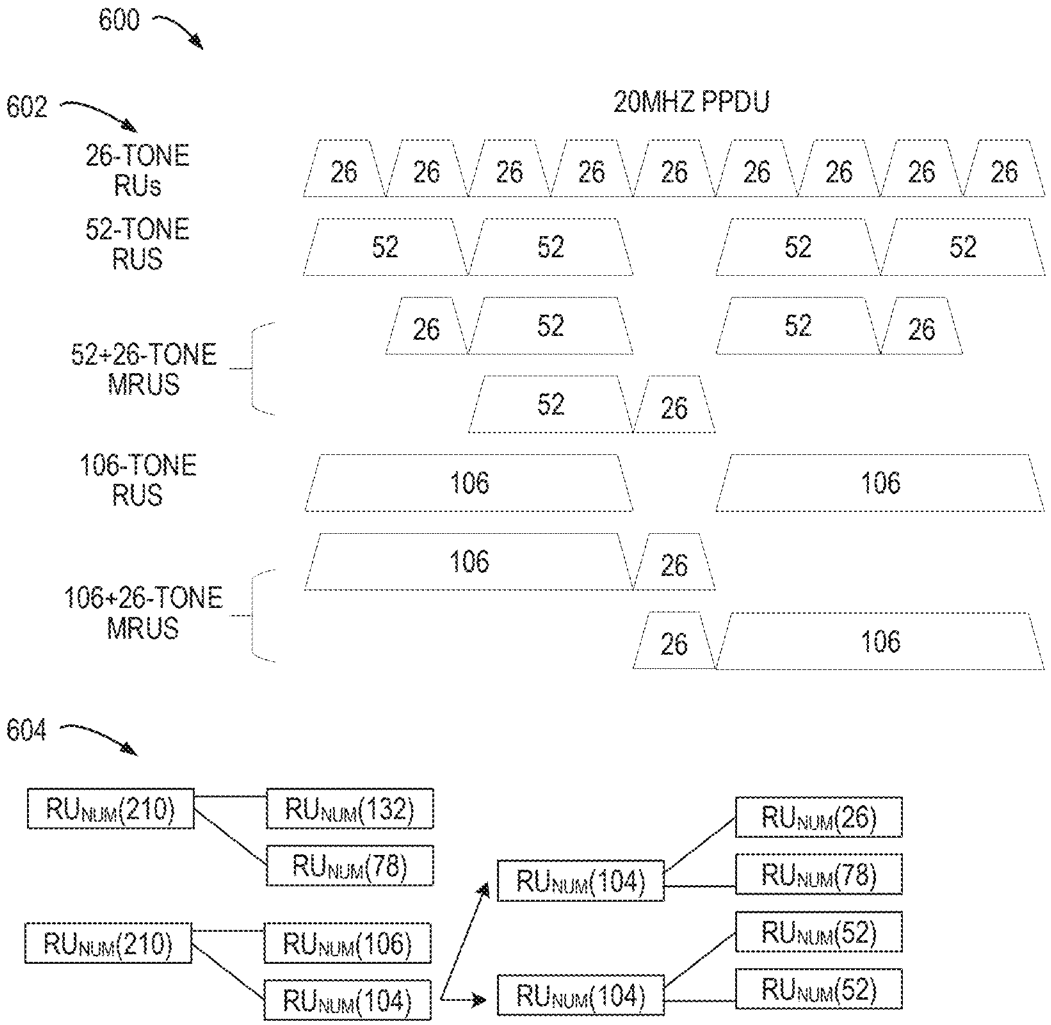
FIG. 6 illustrates a schematic diagram of an example procedure for performing an individual RU allocation strategy in accordance with some example implementations of the present disclosure.

FIG. 6 illustrates a schematic diagram of an example procedure 600 for performing an individual RU allocation strategy in accordance with some example implementations of the present disclosure. As illustrated in FIG. 6, the available RUs 602 include different sizes of RUs. Each RU has a fixed index indicating the position in the 20 MHz bandwidth which can also be represented by the frequency range of the corresponding subcarriers. The available RUs 602 include 26-tone RUs, 52-tone RUs, 78-tone RUs, 106-tone RUs and 132-tone RUs.

As illustrated in FIG. 6, the RU requirement of the client is 210 tones. In the allocation procedure 604, the minimum RU number $\mathrm{RU}_{NUM}$ (210) for a RU requirement of 210 tones is divided into one minimum RU number $\mathrm{RU}_{NUM}$ (132) for a RU requirement of 132 tones and one minimum RU number $\mathrm{RU}_{NUM}$ (78) for a RU requirement of 78 tones. Since 132-tone RU and 78-tone RU are available, the minimum RU number $\mathrm{RU}_{NUM}$ (132) and the minimum RU number $RU_{NUM}$ (78) are both one. As a result, a first candidate set of a 132-tone RU and a 78-tone RU is obtained.

Similarly, the minimum RU number $RU_{NUM}$ (210) is also divided into one minimum RU number $RU_{NUM}$ (106) for a RU requirement of 106 tones and one minimum RU number $RU_{NUM}$ (104) for a RU requirement of 104 tones. Since no available RU has the size of 104 tones, the minimum RU number $RU_{NUM}$ (104) is further divided into a minimum RU number $RU_{NUM}$ (78) for a RU requirement of 78 tones and a minimum RU number $RU_{NUM}$ (26) for a RU requirement of 26 tones. Since a 26-tone RU and a 78-tone RU are available, the minimum RU number $RU_{NUM}$ (26) and the minimum RU number $RU_{NUM}$ (78) are both one. As a result, a second candidate set of a 26-tone RU, a 78-tone RU, and a 106-tone RU is obtained.

The RU requirement of 210 tones may also be divided into other combinations of RU sizes. However, an identical candidate set may be obtained. Therefore, other procedures are omitted here. Since the RU number of the first candidate set is 2 and the RU number of the second candidate set is 3, the first candidate set is determined to be the target set.

Figure 7:
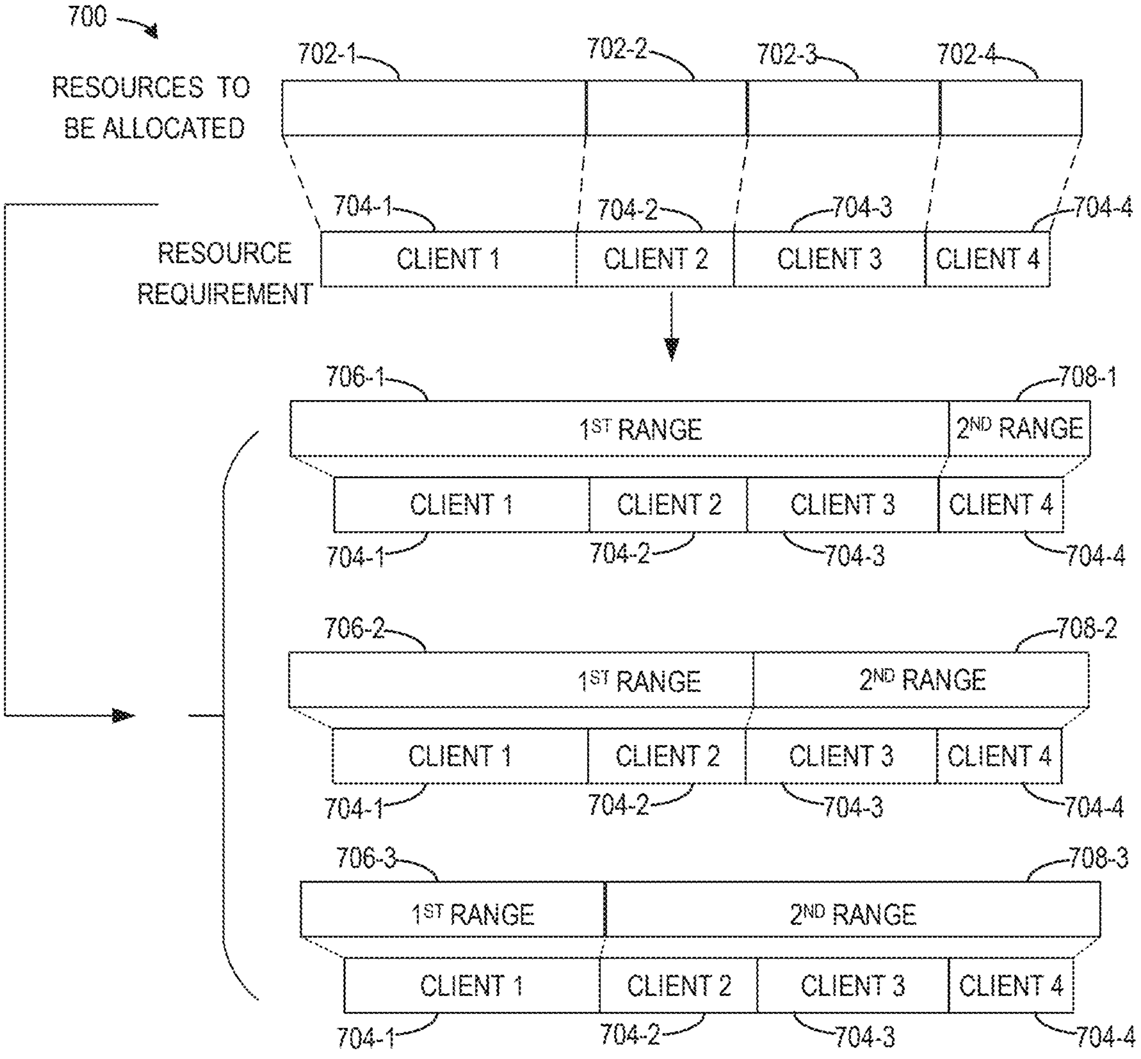
FIG. 7 illustrates a schematic diagram of an example procedure for performing a global RU allocation strategy in accordance with some example implementations of the present disclosure.

Hereinafter, the global allocation strategy will be described with reference to FIGS. 7-9B. FIG. 7 illustrates a schematic diagram of an example procedure 700 for performing a global RU allocation strategy in accordance with some example implementations of the present disclosure. As illustrated in FIG. 7, the AP determines that the resource 702-1 will be allocated to client 1 with an RU requirement 704-1, the resource 702-2 will be allocated to client 2 with an RU requirement 704-2, the resource 702-3 will be allocated to client 3 with an RU requirement 704-3 and the resource 702-4 will be allocated to client 4 with an RU requirement 704-4. Since the resources to be allocated are not redundant, the global allocation strategy is selected.

As illustrated in FIG. 7, the allocation procedure may also be viewed as a dynamic programming problem. In order to solve such problems, the common function is established as follows:

$$\mathrm{MIN\_RU}_{num}(i, j) = \min_{0 \le k \le j-1} (\mathrm{MIN\_RU}_{num}(i - RU_{unit\_X}, k) + \cos t(i, k, j)) \quad (6)$$

where $\mathrm{MIN\_RU}_{num}(i, j)$ denotes the minimum RU number when allocating the first i bandwidth of RUs to the first j clients, $RU_{unit\_X}$ denotes the bandwidth of the first x RUs, k denotes the previous clients, ranging from 0 to j−1, and cost (i, k, j) denotes the cost or bandwidth requirement of allocating the $RU_{unit\_X}$ resource to clients k to j. The result can be saved as dp[i][j] in form of a two-dimensional array.

As illustrated in FIG. 7, the target set of clients including a client 1, a client 2, a client 3, and a client 4. The last client 4 in the target set is selected into a second group and the rest of the clients are selected into the first group. Accordingly, the resources to be allocated are divided into two ranges respectively. As illustrated, the resources are divided into a first range 706-1 of resources including the resource 702-1, the resource 702-2 and the resource 702-3, and a second range 708-1 including the resource 702-4. The RU number for the first range 706-1 and the RU number for the second range 78-1 are obtained.

After the first pair of the first range 706-1 and the second range 708-1 are analyzed, the last one in the first group, client 3, is transferred to the second group. Thus, the first group includes the client 1 and the client 2 while the second group includes the client 3 and the client 4. Accordingly, the resources are divided into a first range 706-2 of resources including the resource 702-1, the resource 702-2, and a second range 708-2 including the resource 702-3 and the resource 702-4. The RU number for the first range 706-2 and the RU number for the second range 708-2 are obtained.

Similarly, after the first pair of the first range 706-2 and the second range 708-2 are analyzed, the last one in the first group, the client 2, is transferred to the second group. Thus, the first group includes the client 1 while the second group includes the client 2, the client 3, and the client 4. Accordingly, the resources are divided into a first range 706-3 of resources including the resource 702-1, and a second range 708-3 including the resource 702-2, the resource 702-3, and the resource 702-4. The RU number for the first range 706-3 and the RU number for the second range 708-3 are obtained.

After the RU number for all the pairs of groups is obtained, the pair with a smallest sum of the RU number for the first group and the RU number for the second group is selected as a target set to be allocated to the clients. In some implementations, in order to determine the RU number for the first range 706-1, analogous procedure may be performed such that a minimum RU number when allocating the first range 706-1 to the client 1, the client 2, and the client 3 is obtained. In this way, the procedure can be performed iteratively to obtain a target set for all the clients such that the integral RU number can be minimized.

Figure 8:
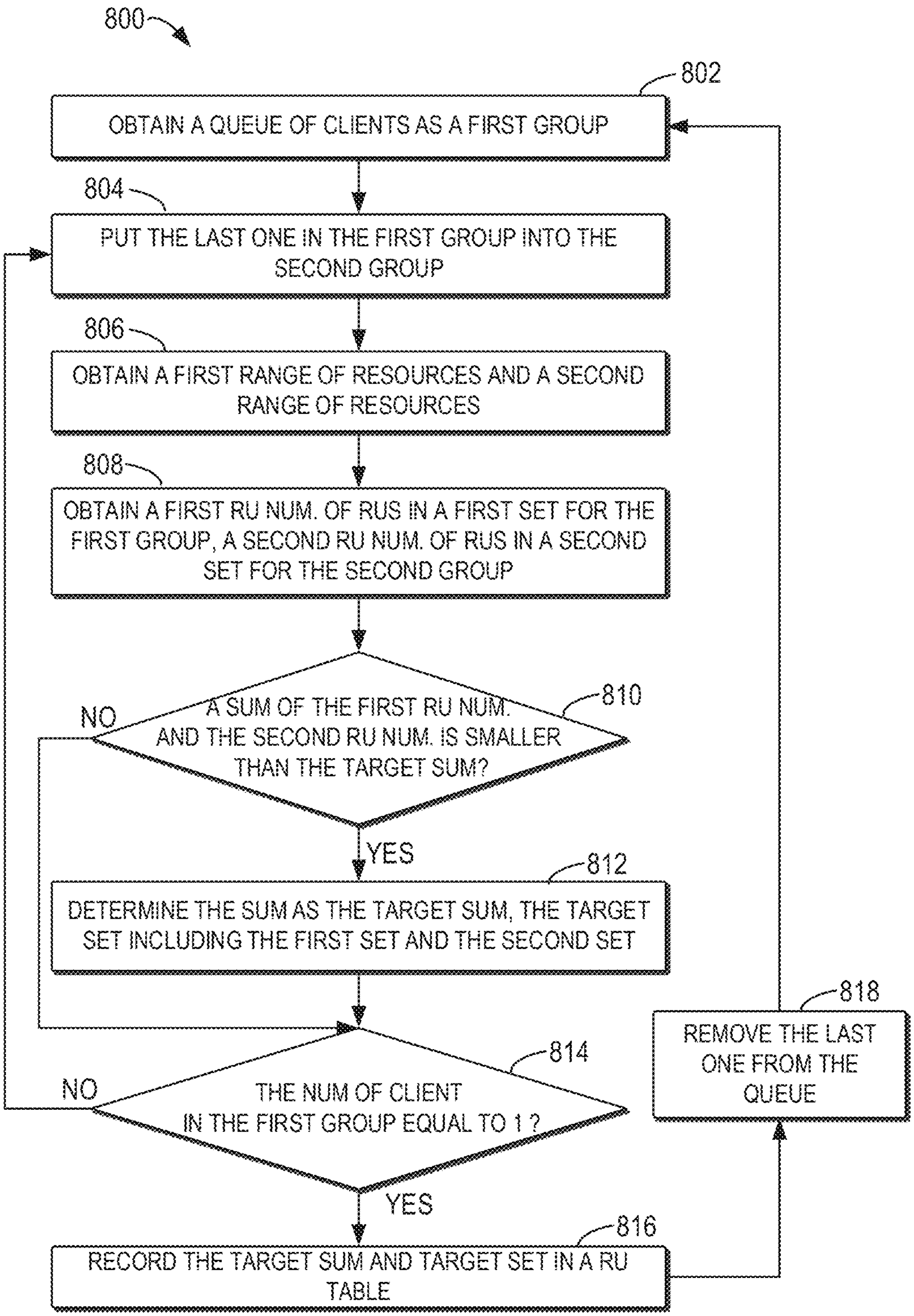
FIG. 8 illustrates a flowchart of an example method for performing a global RU allocation strategy in accordance with some example implementations of the present disclosure.

FIG. 8 illustrates a flowchart of an example method 800 for performing a global RU allocation strategy in accordance with some example implementations of the present disclosure. For the purpose of illustration, the method 800 will be described in association with the implementation as illustrated in FIG. 7. For example, the method 800 may be performed by an AP.

As illustrated in FIG. 8, at 802, the AP obtains a queue of clients as a first group, for example, the queue of the client 1, the client 2, the client 3, and the client 4 as illustrated in FIG. 7. At 804, the AP puts the last one in the first group into the second group. In this case, the second group is initially empty. At 806, the AP obtains a first range of resources and a second range of resources.

At 808, the AP obtains a first RU number of RUs in a first set of RUs allocated for the first group and a second RU number of RUs in a second set of RUs allocated for the second group. At 810, the AP determines whether a sum of the first RU number and the second RU number is smaller than the target sum. In this case, the initial value of the target sum is null. If the AP determines that the sum of the first RU number and the second RU number is smaller than the target sum, the method 800 proceeds to 812. At 812, the AP determines the sum as the target sum and determines a target set of RUs including the first set and the second set.

If the AP determines that the sum of the first RU number and the second RU number is not smaller than the target sum, the method 800 proceeds to 814. At 814, the AP determines whether the number of clients in the first group is equal to 1. If the AP determines that the number of clients in the first group is not equal to 1, the method 800 proceeds to 804 to regroup the clients so that all the pairs of groups may be analyzed.

If the AP determines that the number of clients in the first group is equal to 1, the method 800 proceeds to 816. At 816, the AP records the target sum and the target set in a RU number table. At 818, the AP removes the last one from the queue to initiate a new iteration.

Figure 9A:
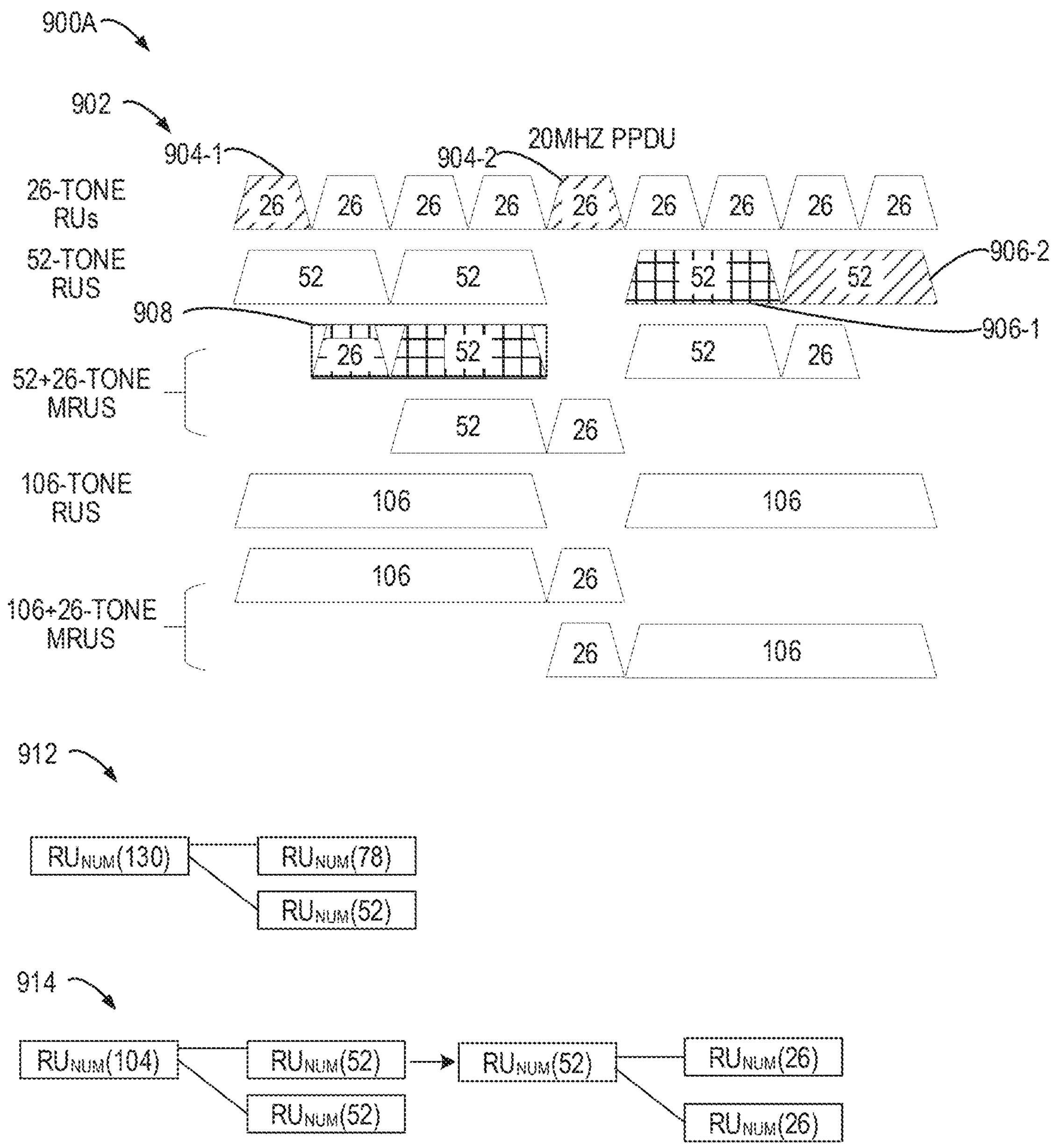
FIGS. 9A-9B illustrate schematic diagrams of example procedures for performing a global RU allocation strategy in accordance with some example implementations of the present disclosure.

FIG. 9A illustrates a schematic diagram of example procedure 900A for performing a global RU allocation strategy in accordance with some example implementations of the present disclosure. As illustrated in FIG. 9A, the available RUs 902 include different sizes of RUs. The available RUs 902 include 26-tone RUs, 52-tone RUs, 78-tone RUs, 106-tone RUs and 132-tone RUs.

As illustrated in FIG. 9A, the first RU requirement of the first client is 130 tones and the second RU requirement of the second client is 104 tones. In the allocation procedure 912 for the first client, the minimum RU number $RU_{NUM}$ (130) for the first RU requirement of 130 tones is divided into one minimum RU number $RU_{NUM}$ (78) for a RU requirement of 78 tones and one minimum RU number $RU_{NUM}$ (52) for a RU requirement of 52 tones. Since a 52-tone RU and a 78-tone RU are available as shown in FIG. 9A, the minimum RU number $RU_{NUM}$ (78) and the minimum RU number $RU_{NUM}$ (52) are both one. As a result, a 52-tone RU 906-1 and a 78-tone RU 908 are allocated to the first client and a first candidate set of the 52-tone RU 906-1 and the 78-tone RU 908 is obtained.

Similarly, in the allocation procedure 914 for the second client the minimum RU number $RU_{NUM}$ (104) for the second RU requirement of 104 tones is also divided into one minimum RU number $RU_{NUM}$ (52) for a RU requirement of 52 tones and one minimum RU number $RU_{NUM}$ (52) for a RU requirement of 52 tones. After the allocation for the first client, only one 52-tone RU 906-2 is available, the minimum RU number $RU_{NUM}$ (52) is divided into two minimum RU numbers $RU_{NUM}$ (26). Since there are two 26-tone RUs available, the minimum RU numbers $RU_{NUM}$ (26) are both one. As a result, a 26-tone RU 904-1, a 26-tone RU 904-2, and a 52-tone RU 906-2 are allocated to the second set and a second candidate set of the 26-tone RU 904-1, the 26-tone RU 904-2 and the 52-tone RU 906-2 is obtained. The sum of the RU number for the first candidate set and the RU number for the second candidate set is thus 2+3=5.

Figure 9B:
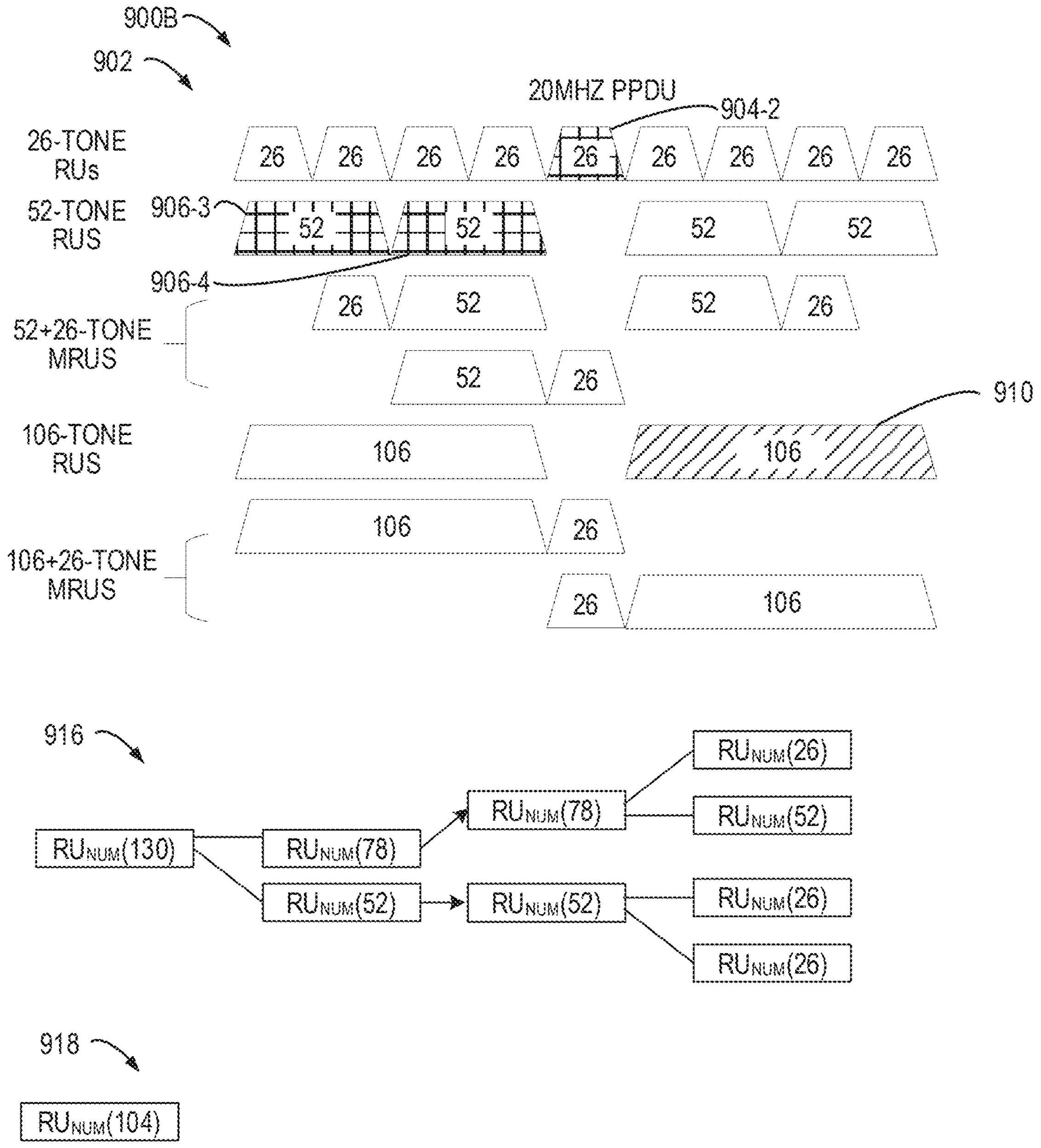

FIG. 9B illustrates a further schematic diagram of example procedure 900B for performing a global RU allocation strategy in accordance with some example implementations of the present disclosure. The RU requirements of the first client and the second client and the resources to be allocated are the same as those as illustrated in FIG. 9A.

As illustrated in FIG. 9B, the first RU requirement of the first client is 130 tones and the second RU requirement of the second client is 104 tones. In the allocation procedure 916 for the first client, the minimum RU number $RU_{NUM}$ (130) for the first RU requirement of 130 tones is divided into one minimum RU number $RU_{NUM}$ (78) for a RU requirement of 78 tones and one minimum RU number $RU_{NUM}$ (52) for a RU requirement of 52 tones. Differently from the implementation as illustrated in FIG. 9A, the minimum RU number $RU_{NUM}$ (78) is further divided into one minimum RU number $RU_{NUM}$ (26) and one minimum RU number $RU_{NUM}$ (52). The minimum RU number $RU_{NUM}$ (26) and the minimum RU number $RU_{NUM}$ (52) are both one. As a result, a 26-tone RU 904-2, a 52-tone RU 906-3, and a 52-tone RU 906-4 are allocated to the first client and a second candidate set of the 26-tone RU 904-2, the 52-tone RU 906-3 and the 52-tone RU 906-4 is obtained.

Further, in the allocation procedure 918 for the second client, as for the minimum RU number $RU_{NUM}$ (104), since there is a 106-tone RU available, the 106-tone RU can be allocated to the second client. As a result, a 106-tone RU 910 is allocated to the second client and a fourth candidate set of the 106-tone RU 910 is obtained. The sum of the RU number for the third candidate set and the RU number for the fourth candidate set is thus 3+1=4.

Since the sum of the RU numbers in the implementation as illustrated in FIG. 9B is smaller than the sum of the RU numbers in the implementation as illustrated in FIG. 9A, the first candidate set and the second candidate set in the implementation as illustrated in FIG. 9B is determined to be the target set. According to the implementations as illustrated in FIGS. 9A and 9B, a global optimized allocation scheme can be achieved by taking all the requirements of all the clients into consideration.

Figure 10:
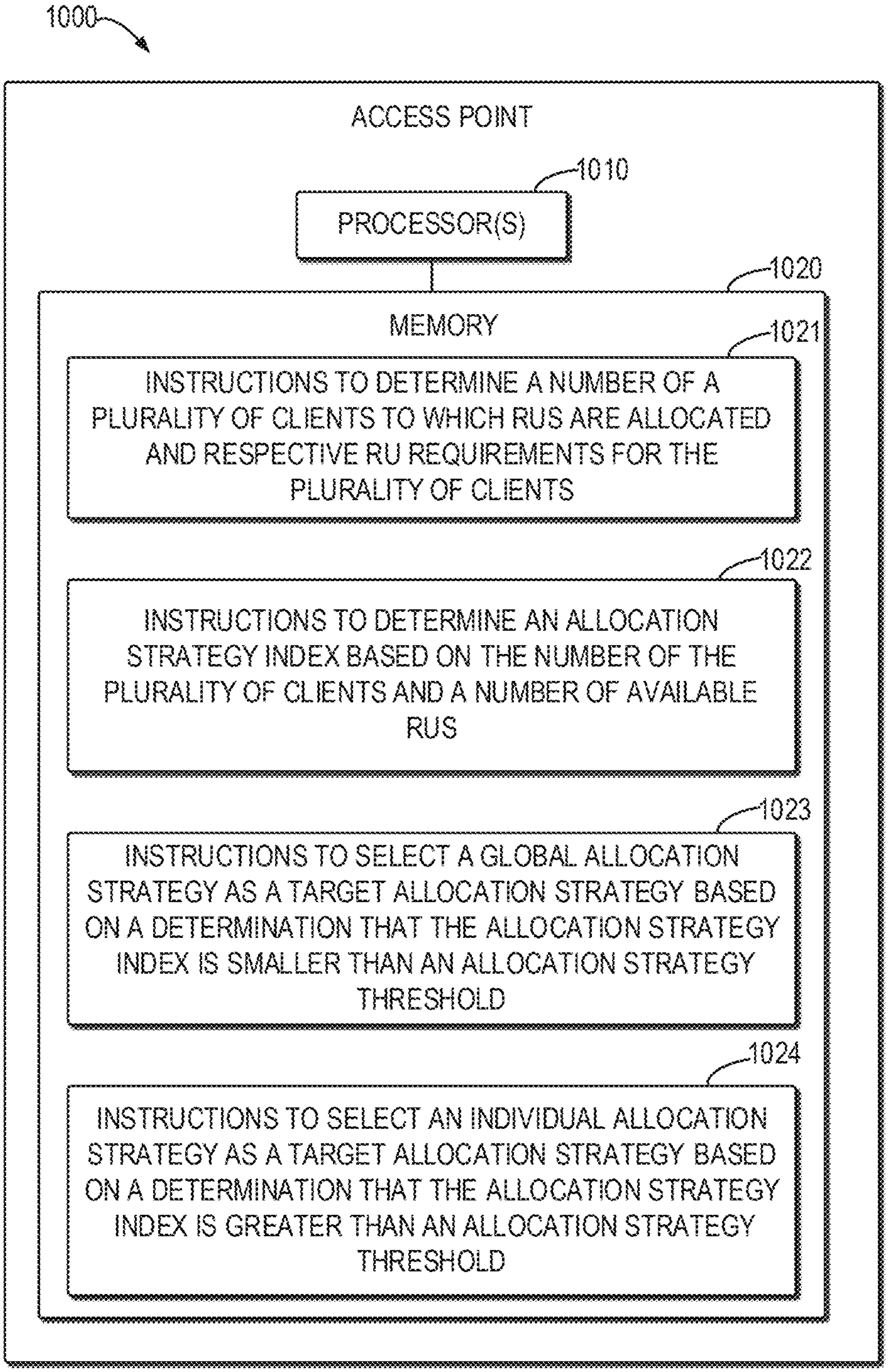
FIG. 10 illustrates a block diagram of an example AP in accordance with some example implementations of the present disclosure.

FIG. 10 illustrates a block diagram of an example AP 1000 in accordance with some example implementations of the present disclosure. The AP 1000 may be corresponding to one of the plurality of APs 110 as illustrated in FIG. 1. The AP 1000 comprises at least one processor 1010 and a memory 1020 coupled to at least one processor 1010. The memory 1020 stores instructions to cause at least one processor 1010 to implement actions.

As illustrated in FIG. 10, the memory 1020 stores instructions 1021 to determine a number of a plurality of clients to which resource units (RUs) are allocated and the respective RU requirements for the plurality of clients. The memory 1020 further stores instructions 1022 to determine an allocation strategy index based on the number of the plurality of clients and a number of available RUs. In this case, the allocation strategy index indicates an extent of potential resource conflicts between the plurality of clients. The memory 1020 further stores instructions 1023 to select a global allocation strategy as a target allocation strategy based on a determination that the allocation strategy index is greater than an allocation strategy threshold. In this case, the global allocation strategy is determined based on a total number of RUs to be allocated to the plurality of clients and RU requirements of the plurality of clients. The memory 1020 further stores instructions 1024 to select an individual allocation strategy as the target allocation strategy based on a determination that the allocation strategy index is smaller than the allocation strategy threshold. In this case, the individual allocation strategy is determined based on a number of RUs to be allocated to each of the plurality of clients and RU requirement of each client. The memory 1020 further stores instructions 1025 to determine RUs to be allocated to the plurality of clients by performing the target allocation strategy. The present disclosure also provides at least one computer program product tangibly stored on a non-transitory computer-readable storage medium. The computer program product includes program codes or instructions which can be executed to carry out the method as described above with reference to FIGS. 2, 3, 5, 8 and procedures as described above with reference to FIGS. 4, 6, 7 and 9A-B.

While the above discussion used a Wi-Fi communication standard as an illustrative example, in other implementations a wide variety of communication standards and, more generally, wireless communication technologies may be used. Furthermore, while some of the operations in the foregoing implementations were implemented in hardware or software, in general, the operations in the preceding implementations can be implemented in a wide variety of configurations and architectures. Therefore, some or all of the operations in the foregoing implementations may be performed in hardware, software, or both.

It should be noted that specific terms disclosed in the present disclosure are proposed for convenience of description and a better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a computer-readable medium may be any tangible medium that may contain or store a program for use by or in connection with an instruction execution system, apparatus, or device. The computer-readable medium may be a computer-readable signal medium or a computer-readable storage medium. A computer-readable medium may include but is not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order illustrated or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable combination.

In the foregoing Detailed Description of the present disclosure, reference is made to the accompanying drawings that form a part hereof, and in which is illustrated by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method, comprising:

determining, by an access point (AP), a number of a plurality of clients to which resource units (RUs) are allocated and respective RU requirements for the plurality of clients;

determining, by the AP, an allocation strategy index based on the number of the plurality of clients and a number of available RUs, the allocation strategy index indicating an extent of potential resource conflicts between the plurality of clients;

based on a determination that the allocation strategy index is smaller than an allocation strategy threshold, selecting, by the AP, a global allocation strategy as a target allocation strategy, the global allocation strategy being determined based on a total number of RUs to be allocated to the plurality of clients and RU requirements of the plurality of clients;

based on a determination that the allocation strategy index is greater than the allocation strategy threshold, selecting, by the AP, an individual allocation strategy as the target allocation strategy, the individual allocation strategy being determined based on a number of RUs to be allocated to each of the plurality of clients and RU requirement of each client; and determining, by the AP, RUs to be allocated to the plurality of clients by performing the target allocation strategy, wherein determining the RUs to be allocated to the plurality of clients comprises:

based on selecting the individual allocation strategy as the target allocation strategy, determining, by the AP, a target partial bandwidth of a part of an RU requirement of a target client;

dividing, by the AP, the target partial bandwidth into a plurality of candidate combinations, each candidate combination including one RU and a remainder bandwidth; and obtaining, by the AP, a plurality of RU numbers of RUs for providing respective remainder bandwidths;

selecting, by the AP and based on the plurality of RU numbers, a target combination; and determining, by the AP and based on a target RU and the remainder bandwidth in the target combination, a target set of RUs for the target client.

2. The method of claim 1, wherein determining the target set of RUs comprising:

updating, by the AP, the target partial bandwidth with the remainder bandwidth in the target combination to obtain a plurality of target partial bandwidths; and obtaining, by the AP, the target set of RUs including a plurality of target RUs for the plurality of target partial bandwidths.

3. The method of claim 1, wherein the target combination is associated with the smallest RU number.

4. The method of claim 1, further comprising:

increasing, by the AP, the RU number of the remainder bandwidth in the target combination by one to obtain an RU number of the target partial bandwidth;

storing, by the AP, the obtained RU number in an RU number table.

5. The method of claim 1, wherein determining the RUs to be allocated to the plurality of clients comprises:

based on selecting the global allocation strategy as the target allocation strategy, determining, by the AP, a set of the plurality of clients;

dividing, by the AP, the set of clients into a plurality of candidate pairs of a first group and a second group;

determining, by the AP and for each candidate pair, a first RU number of RUs allocated to the first group and a second RU number of RUs allocated to the second group of clients to obtain a plurality of first RU numbers and a plurality of second RU numbers;

selecting, by the AP and based on the plurality of first RU numbers and the plurality of second RU numbers, a target pair; and determining, by the AP, a target set of RUs for the set of clients including RUs allocated to the first group and the second group of clients in the target pair.

6. The method of claim 5, further comprising:

obtaining, by the AP, a first range of resources satisfying the RU requirements of the first group and a second range of resources satisfying the RU requirements of the second group;

determining, by the AP, a first set of available RUs in the first range of resources and a second set of available RUs in the second range of resources;

determining, by the AP and based on the first set of available RUs, a first set of RUs allocated to the first group such that the first RU number is minimized; and determining, by the AP and based on the first set of available RUs and the second set of available RUs, a first set of RUs allocated to the first group and a second set of RUs allocated to the second group such that the first RU number is minimized and the second RU number is minimized.

7. The method of claim 5, wherein the target pair is associated with the smallest sum of the first RU number and the second RU number.

8. The method of claim 1, wherein the available RUs include at least one of: a single RU and multiple RUs.

9. The method of claim 1, wherein determining the allocation strategy index based on the number of the plurality of clients and a number of available RUs comprises:

determining, by the AP, a total bandwidth of the available RUs; and determining a ratio of the total bandwidth to the number of the plurality of clients.

10. The method of claim 1, further comprising:

receiving, by the AP and from requesting clients, requests for resource allocation; and determining, by the AP, the plurality of clients of the requesting clients to which RUs are allocated and respective bandwidths for the plurality of clients based on at least one of:

a number of the requesting clients;

RU requirements of the associated clients;

a bandwidth threshold;

a packet loss or a flapping rate;

a ratio of used RUs to the maximum supported RUs;

a maximum bandwidth and a maximum number of RUs; or reserved RUs and bandwidth provided by the reserved RUs.

11. A first access point (AP) comprising:

at least one processor; and a memory coupled to the at least one processor, the memory storing instructions to cause the at least one processor to:

determine a number of a plurality of clients to which resource units (RUs) are allocated and respective RU requirements for the plurality of clients;

determine an allocation strategy index based on the number of the plurality of clients and a number of available RUs, the allocation strategy index indicating an extent of potential resource conflicts between the plurality of clients;

based on a determination that the allocation strategy index is smaller than an allocation strategy threshold, select a global allocation strategy as a target allocation strategy, the global allocation strategy being determined based on a total number of RUs to be allocated to the plurality of clients and RU requirements of the plurality of clients;

based on a determination that the allocation strategy index is greater than the allocation strategy threshold, select an individual allocation strategy as the target allocation strategy, the individual allocation strategy being determined based on a number of RUs to be allocated to each of the plurality of clients and RU requirement of each client; and determine RUs to be allocated to the plurality of clients by performing the target allocation strategy by causing the at least on processor to:

divide the set of clients into a plurality of candidate pairs of a first group and a second group;

determine, for each candidate pair, a first RU number of RUs allocated to the first group and a second RU number of RUs allocated to the second group of clients to obtain a plurality of first RU numbers and a plurality of second RU numbers;

select, based on the plurality of first RU numbers and the plurality of second RU numbers, a target pair; and determine a target set of RUs for the set of clients including RUs allocated to the first group and the second group of clients in the target pair.

12. The AP of claim 11, wherein the instructions to cause the at least one processor to determine the RUs to be allocated to the plurality of clients comprise instructions to cause the at least one processor to:

based on selecting the individual allocation strategy as the target allocation strategy, determine a target partial bandwidth of a part of an RU requirement of a target client;

divide the target partial bandwidth into a plurality of candidate combinations, each candidate combination including one RU and a remainder bandwidth;

obtain a plurality of RU numbers of RUs for providing respective remainder bandwidths;

select, based on the plurality of RU numbers, a target combination; and determine, based on a target RU and the remainder bandwidth in the target combination, a target set of RUs for the target client.

13. The AP of claim 12, wherein the instructions to cause the at least one processor to determine the target set of RUs comprise instructions to cause the at least one processor to:

update the target partial bandwidth with the remainder bandwidth in the target combination to obtain a plurality of target partial bandwidths; and obtain the target set of RUs including a plurality of target RUs for the plurality of target partial bandwidths.

14. The AP of claim 11, wherein the instructions further comprise instructions to cause the at least one processor to:

increase the RU number of the remainder bandwidth in the target combination by one to obtain an RU number of the target partial bandwidth; and store the obtained RU number in an RU number table.

15. The AP of claim 11, wherein the instructions further comprise instructions to cause the at least one processor to:

obtain a first range of resources satisfying the RU requirements of the first group and a second range of resources satisfying the RU requirements of the second group;

determine a first set of available RUs in the first range of resources and a second set of available RUs in the second range of resources;

determine, based on the first set of available RUs, a first set of RUs allocated to the first group such that the first RU number is minimized; and determine, based on the first set of available RUs and the second set of available RUs, a first set of RUs allocated to the first group and a second set of RUs allocated to the second group such that the first RU number is minimized and the second RU number is minimized.

16. The AP of claim 11, wherein the target pair is associated with the smallest sum of the first RU number and the second RU number.

17. The AP of claim 11, wherein determining an allocation strategy index based on the number of the plurality of clients and a number of available RUs comprises:

determining, by the AP, a total bandwidth of the available RUs; and determining a ratio of the total bandwidth to the number of the plurality of clients.

18. A non-transitory computer-readable medium comprising instructions stored thereon which, when executed by an access point (AP), cause the AP to:

determine a number of a plurality of clients to which resource units (RUs) are allocated and respective RU requirements for the plurality of clients;

determine an allocation strategy index based on the number of the plurality of clients and a number of available RUs, the allocation strategy index indicating an extent of potential resource conflicts between the plurality of clients;

based on a determination that the allocation strategy index is smaller than an allocation strategy threshold, select a global allocation strategy as a target allocation strategy, the global allocation strategy being determined based on a total number of RUs to be allocated to the plurality of clients and RU requirements of the plurality of clients;

based on a determination that the allocation strategy index is greater than the allocation strategy threshold, select an individual allocation strategy as the target allocation strategy, the individual allocation strategy being determined based on a number of RUs to be allocated to each of the plurality of clients and RU requirement of each client; and determine, RUs to be allocated to the plurality of clients by performing the target allocation strategy by causing the AP to:

divide the set of clients into a plurality of candidate pairs of a first group and a second group;

determine, for each candidate pair, a first RU number of RUs allocated to the first group and a second RU number of RUs allocated to the second group of clients to obtain a plurality of first RU numbers and a plurality of second RU numbers;

select, based on the plurality of first RU numbers and the plurality of second RU numbers, a target pair; and determine a target set of RUs for the set of clients including RUs allocated to the first group and the second group of clients in the target pair.

* * * * *